(12) United States Patent
Matsumoto et al.

(10) Patent No.: US 12,157,482 B2
(45) Date of Patent: Dec. 3, 2024

(54) ON-VEHICLE DEVICE

(71) Applicant: DENSO TEN Limited, Kobe (JP)

(72) Inventors: Shinsuke Matsumoto, Kobe (JP); Haruya Tsugimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 477 days.

(21) Appl. No.: 17/436,239

(22) PCT Filed: Oct. 15, 2020

(86) PCT No.: PCT/JP2020/038984
§ 371 (c)(1),
(2) Date: Sep. 3, 2021

(87) PCT Pub. No.: WO2022/079870
PCT Pub. Date: Apr. 21, 2022

(65) Prior Publication Data
US 2022/0324471 A1    Oct. 13, 2022

(51) Int. Cl.
*B60W 50/14* (2020.01)
*B60R 1/20* (2022.01)

(52) U.S. Cl.
CPC ............... *B60W 50/14* (2013.01); *B60R 1/20* (2022.01); *B60W 2050/146* (2013.01); *B60W 2422/20* (2013.01)

(58) Field of Classification Search
None
See application file for complete search history.

(56) References Cited

U.S. PATENT DOCUMENTS

2021/0206271 A1 * 7/2021 Matthews .............. B60K 35/00

FOREIGN PATENT DOCUMENTS

| EP | 3045340 A1 * | 7/2016 | ............. B60K 35/00 |
| JP | 2006-351094 A | 12/2006 | |
| JP | 4485522 B2 | 6/2010 | |
| JP | 2013224099 A * | 10/2013 | ............. B60R 11/02 |
| JP | 2014-182268 A | 9/2014 | |
| JP | 2016-130037 A | 7/2016 | |

* cited by examiner

*Primary Examiner* — Heather R Jones
(74) *Attorney, Agent, or Firm* — Oliff PLC

(57) ABSTRACT

An on-vehicle device includes a display device, a body device, and a support plate. The body device is installed on a back surface of the display device. The support plate includes a fixation part with a plate shape that is fixed on a top surface of the body device and a support part with a plate shape that is continuous with the fixation part and is formed so as to be bent, and supports a back surface of the display device by a plate spring part that is formed on the support part.

6 Claims, 4 Drawing Sheets

ON-VEHICLE DEVICE

CROSS-REFERENCE TO RELATED APPLICATION(S)

This application is a national stage application of International Application No. PCT/JP2020/038984 filed on Oct. 15, 2020, which designates the United States, the entire contents of which are herein incorporated by reference.

FIELD

A disclosed embodiment(s) relate(s) to an on-vehicle device.

BACKGROUND

An on-vehicle device has conventionally been provided that includes a display device and a body device that is installed on a back surface of the display device (see, for example, Patent Literature 1).

CITATION LIST

Patent Literature

Patent Literature 1: Japanese Patent Application Publication No. 2006-351094

SUMMARY

Technical Problem

However, in an on-vehicle device where a body device is installed on a back surface of a display device, distortion may be caused on an information display surface of the display device depending on a method of fixation of the display device on the body device.

An aspect of an embodiment is provided by taking the above into consideration and aims to provide an on-vehicle device that is capable of preventing distortion from being caused on an information display surface of a display device.

Solution to Problem

An on-vehicle device according to an aspect of an embodiment includes a display device, a body device, and a support plate. The body device is installed on a back surface of the display device. The support plate has a fixation part with a plate shape that is fixed on a top surface of the body device and a support part with a plate shape that is continuous with the fixation part and is formed so as to be bent, and supports a back surface of the display device by a plate spring part that is formed on the support part.

Advantageous Effects of Invention

It is possible for an on-vehicle device according to an aspect of an embodiment to prevent distortion from being caused on an information display surface of a display device.

DESCRIPTION OF EMBODIMENTS

Hereinafter, an embodiment(s) of an on-vehicle device will be explained in detail with reference to the accompanying drawing(s). Additionally, this invention is not limited by an embodiment(s) as illustrated below. Hereinafter, after on-vehicle devices according to first and second comparative examples are explained, an on-vehicle device according to an embodiment is explained. An on-vehicle device as explained below is a multimedia instrument that includes an audio playback function, a video playback function, and a car navigation function.

Figure 1:
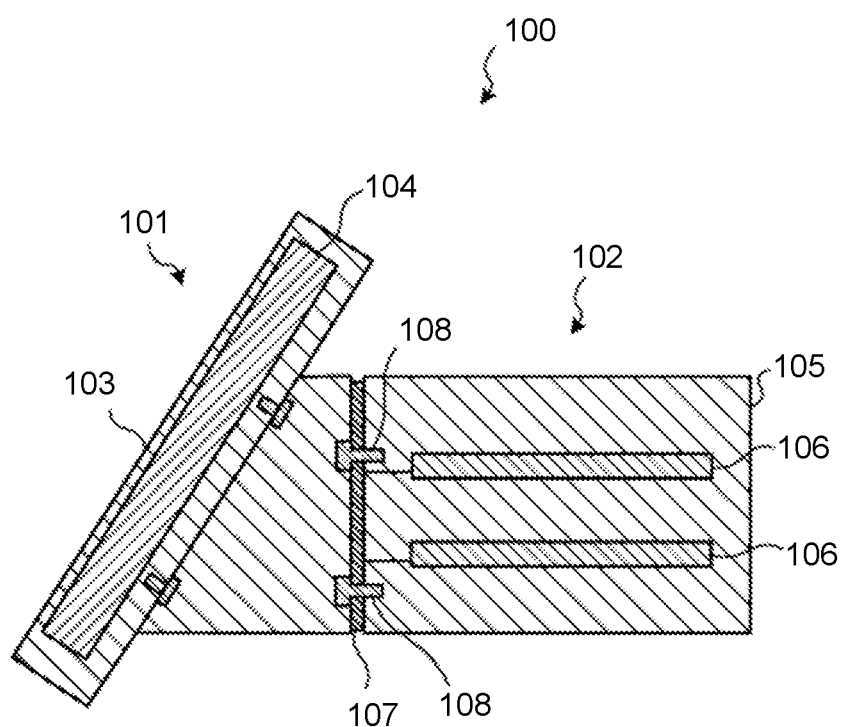
FIG. 1 is a schematic diagram of a side cross section of an on-vehicle device according to a first comparative example.

FIG. 1 is a schematic diagram of a side cross section of an on-vehicle device according to a first comparative example. As illustrated in FIG. 1, an on-vehicle device 100 according to a first comparative example includes a display device 101 and a body device 102. A front surface of a housing 103 of the display device 101 is inclined by a predetermined angle relative to a vertical direction. On the other hand, a back surface of the housing 103 of the display device 101 is parallel to a vertical direction. A liquid crystal panel 104 is provided inside the housing 103 on a side of a front surface thereof.

A substrate(s) 106 is/are provided inside a housing 105 of the body device 102. A driving circuit of the liquid crystal panel 104, an audio playback circuit, a video playback circuit, and the like are provided on the substrate(s) 106. The housing 105 of the body device 102 is provided with a transversely mounted box shape where a length between a front surface and a back surface thereof is greater than a length between a top surface and a bottom surface thereof.

The display device 101 and the body device 102 are fixed by a screw(s) 108 through a metallic front plate 107. The front plate 107 includes a function as a lid of the housing 105 and a function of electrically connecting the display device 101 and the body device 102. The liquid crystal panel 104 and the substrate(s) 106 are connected to the metallic front plate 107, so as to ensure ground thereof.

In a case where the on-vehicle device 100 is mounted on a vehicle, the housing 105 of the body device 102 is housed in a dashboard of the vehicle. Herein, the housing 105 is transversely mounted, so as to occupy a large space in a depth direction thereof. Hence, it is difficult to mount the on-vehicle device 100 on a vehicle with a small space in a dashboard thereof, such as, for example, a compact car. Hence, an on-vehicle device is also provided where the body device 102 is longitudinally mounted.

Figure 2:
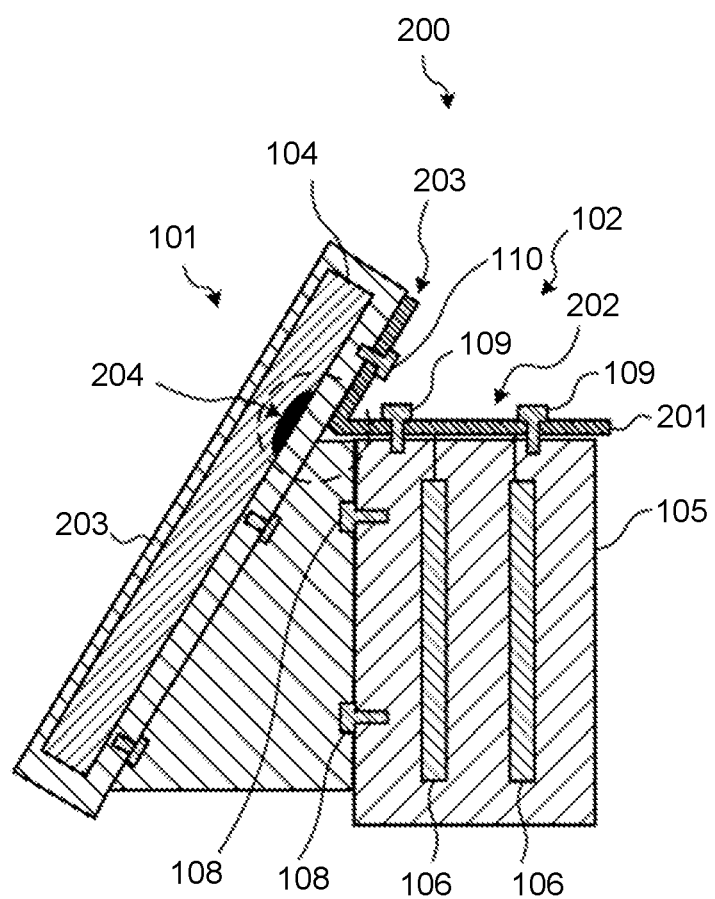
FIG. 2 is a schematic diagram of a side cross section of an on-vehicle device according to a second comparative example.

FIG. 2 is a schematic diagram of a side cross section of an on-vehicle device according to a second comparative example. Herein, a component that is identical to a component as illustrated in FIG. 1, among components as illustrated in FIG. 2, will be provided with a sign that is identical to a sign as illustrated in FIG. 1 so as to omit a redundant explanation thereof.

As illustrated in FIG. 2, an on-vehicle device 200 according to a second comparative example is attached to a back surface of a display device 101 in a state where a body device 102 is longitudinally mounted. Thereby, a space that is occupied by a housing 105 in a depth direction thereof is decreased. Hence, it is possible to mount the on-vehicle device 200 even on a vehicle with a small space in a dashboard thereof.

However, as the on-vehicle device 102 is merely vertically mounted and attached to a back surface of the display device 101, it is not possible to ensure ground of a liquid crystal panel 104. Specifically, a front plate 107 is attached to an end surface of the housing 105 in a longitudinal direction thereof. Hence, as the body device 102 is vertically mounted, the front plate 107 is attached to a top surface of the housing 105 and is not electrically connected to the display device 101 that is attached to a front surface of the housing 105.

Hence, in the on-vehicle device 200, a metallic support plate 201, instead of the front plate 107, is attached to a top surface of the housing 105. The support plate 201 has a fixation part 202 with a plate shape that is fixed on a top surface of the body device 102 and a support part 203 with a plate shape that is continuous with the fixation part 202 and is formed so as to be bent. The support part 203 is inclined by a predetermined angle relative to a vertical direction, similarly to a front surface of a housing 103 of the display device 101.

The fixation part 202 is fixed on a top surface of the housing 105 by a screw(s) 109. The support part 203 is fixed on a top inclined surface on a back surface of a housing 103 of the display device 101 by a screw(s) 110. Thereby, the display device 101 and the metallic support plate 201 are electrically connected, so that it is possible to ensure ground of the liquid crystal panel 104.

However, a slight variation in an inclination angle of the support part 203 is caused depending on accuracy of bending formation thereof. As the support part 203 and a back surface of the display device 101 are forcibly fixed by the screw(s) 110 in a state where an inclination angle of the back surface of the display device 101 does not coincide with an inclination angle of the support part 203, stress is applied to a place that is surrounded by a broken circle in the display device 101. Thereby, distortion 204 is caused in the liquid crystal panel 104 so as to cause uneven display on an information display surface thereof.

Figure 3:
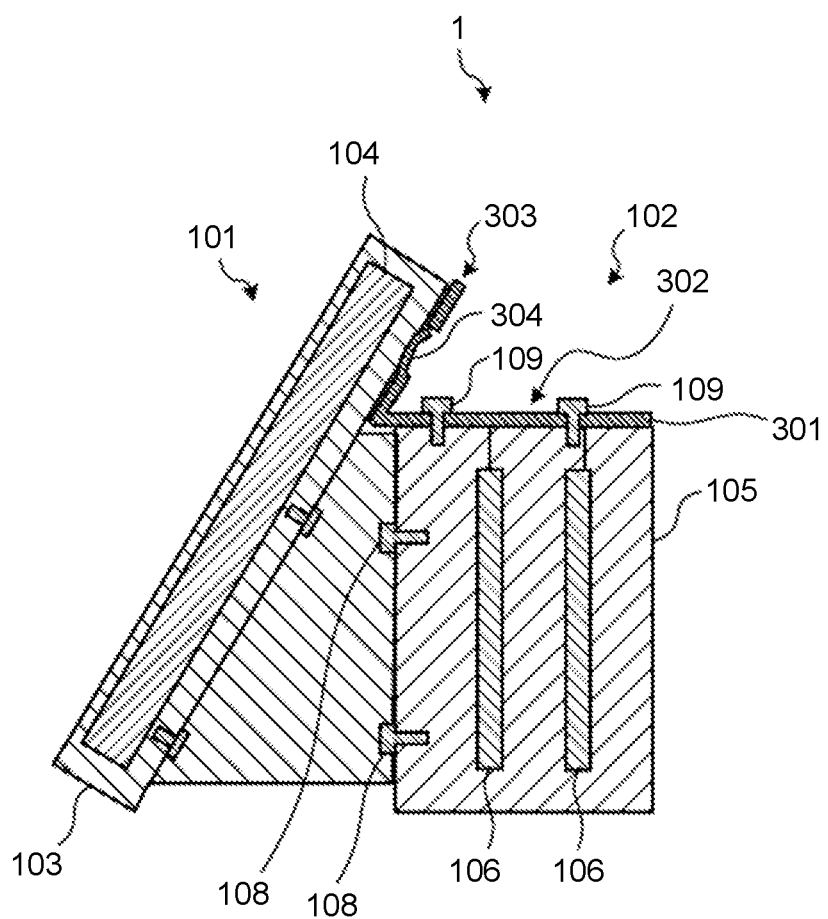
FIG. 3 is a schematic diagram of a side cross section of an on-vehicle device according to an embodiment.
Figure 4:
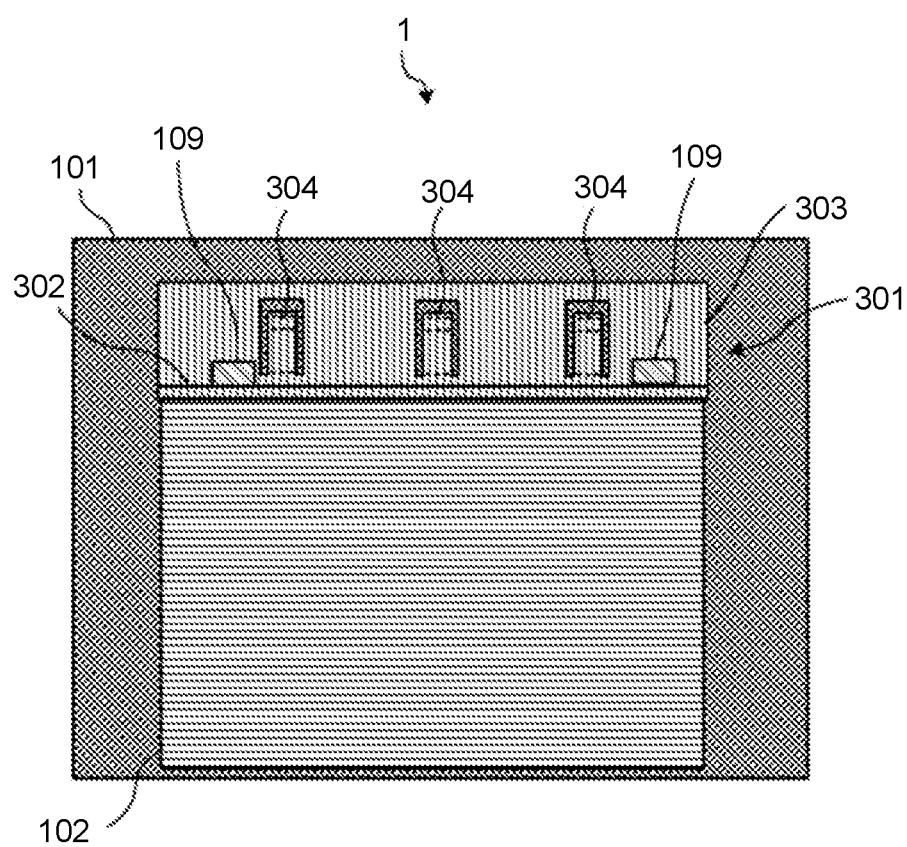
FIG. 4 is a back view of an on-vehicle device according to an embodiment.

Hence, an on-vehicle device according to the present embodiment includes a support plate that is capable of preventing distortion from being caused on an information display surface of a display device 101. FIG. 3 is a schematic diagram of a side cross section of an on-vehicle device according to an embodiment. FIG. 4 is a back view of an on-vehicle device according to an embodiment. Herein, a component that is identical to a component as illustrated in FIG. 2, among components as illustrated in FIG. 3 and FIG. 4, will be provided with a sign that is identical to a sign as illustrated in FIG. 2 so as to omit a redundant explanation thereof.

As illustrated in FIG. 3 and FIG. 4, an on-vehicle device 1 according to an embodiment includes a support plate 301, instead of a support plate 201 as illustrated in FIG. 2. The support plate 301 has a fixation part 302 with a plate shape that is fixed on a top surface of a body device 102 and a support part 303 with a plate shape that is continuous with the fixation part 302 and is formed so as to be bent. A plate spring part(s) 304 is/are formed on the support part 303.

The plate spring part(s) 304 is/are bent from the support part 303 toward a side of a back surface of the display device 101 and press(es) the back surface of the display device 101 in a pushing direction thereof so as to support the back surface of the display device 101. The plate spring part(s) 304 is/are elastically deformed so as to absorb a pushing force of the support part 303 against a back surface of the display device 101. Thereby, in the on-vehicle device 1, a pushing force of the support part 303 against a back surface of the display device 101 is reduced. Therefore, according to the on-vehicle device 1, it is possible to prevent distortion from being caused on an information display surface of a liquid crystal panel 104.

Furthermore, even in a case where an inclination angle of a back surface of the display device 101 does not coincide with an inclination angle of the support part 303, the plate spring part(s) 304 is/are bent toward a side of the back surface of the display device 101 so as to contact the back surface of the display device 101 reliably. Therefore, it is possible to ensure ground of the liquid crystal panel 104.

Furthermore, a part(s) that contacts the plate spring part(s) 304 in the display device 101 of the on-vehicle device 1 is/are formed by an electrically conductive member(s). Thereby, the support plate 301 is electrically connected to a back surface of the display device 101 reliably.

Furthermore, a part that contacts the fixation part 302 in the body device 102 of the on-vehicle device 1 is formed by an electrically conductive member. Thereby, the support plate 301 is electrically connected to a top surface of the body device 102 reliably.

Furthermore, a back surface that contacts the plate spring part(s) 304 and a front surface (an information display surface) that displays information in the display device 101 of the on-vehicle device 1 are inclined by a predetermined angle relative to a vertical direction. In a state where the fixation part 302 is fixe on the body device 102, the support part 303 is inclined by a predetermined angle relative to a vertical direction, similarly to the display device 101.

According to the display device 101, a front surface that displays information is inclined by a predetermined angle so as to be oriented obliquely upward, so that it is possible to improve visibility of an information display surface thereof. Furthermore, according to the support plate 301, it is possible to support a back surface of the display device 101 by the plate spring part(s) 304 without applying an excessive pushing force thereto, even if an inclination angle of the support part 303 and an inclination angle of the display device 101 are slightly different by a variation in a component thereof.

Furthermore, the body device 102 includes a housing 105 with a box shape and a substrate(s) 106. A length between a top surface and a bottom surface of the housing 105 with a box shape is greater than a front surface and a back surface thereof. The substrate(s) 106 is/are arranged inside the housing 105 so as to be provided with a surface orientation that is parallel to those of a front surface and a back surface of the housing 105, and is electrically connected to the support plate 301. Thereby, it is possible to electrically connect an end part(s) of the substrate(s) 106 in a longitudinal direction thereof and the support plate 301 in a shortest distance therebetween.

Furthermore, as illustrated in FIG. 4, the plate spring part(s) 304 is/are provided at an equal distance(s) on the support part 303. Thereby, it is possible for the plate spring part(s) 304 to support a back surface region of the display device 101 that faces the support part 303, by an equal pushing force(s) thereof.

The plate spring part(s) 304 is/are formed integrally with the support plate 301. For example, the plate spring part(s) 304 is/are formed in such a manner that a hole(s) with a C shape is/are formed in the support part 303 and simultaneously a part(s) with a tongue shape is/are pressed so as to provide a plate spring shape(s) thereof. Thereby, it is possible to form a plurality of plate spring parts 304 at once. Furthermore, according to the on-vehicle device 1, a screw(s) 110 that connect(s) and fix(es) the support part 303 and a back surface of the display device 101 is/are not needed, so that a manufacturing cost is reduced.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST

1 on-vehicle device
101 display device
102 body device
103 housing
104 liquid crystal panel
105 housing
106 substrate
107 front plate
108, 109, 110 screw
301 support plate
302 fixation part
303 support part
304 plate spring part

The invention claimed is:

1. An on-vehicle device, comprising:
a display device;
a body device that is installed on a back surface of the display device; and
a support plate that includes (i) a fixation part, which has a plate shape and is fixed on a top surface of the body device, and (ii) a support part, which has a plate shape that is continuous with the fixation part and is formed to be bent, the support plate supporting a back surface of the display device by a plate spring part that is formed on the support part and contacts the back surface of the display device,
wherein a part of the display device that contacts the plate spring part is formed by an electrically conductive member.

2. The on-vehicle device according to claim 1, wherein the back surface of the display device that contacts the plate spring part and a front surface of the display device that displays information are inclined by a predetermined angle relative to a vertical direction, and
the support part is inclined by the predetermined angle relative to the vertical direction in a state where the fixation part is fixed on the body device.

3. The on-vehicle device according to claim 1, wherein the body device includes:
a housing with a box shape, a length between top and bottom surfaces of the housing being greater than a length between front and back surfaces of the housing; and
a substrate that is electrically connected to the support plate and that is arranged inside the housing so as to have a surface orientation that is parallel to orientations of the front surface and the back surface of the housing.

4. An on-vehicle device, comprising:
a display device;
a body device that is installed on a back surface of the display device; and
a support plate that includes (i) a fixation part, which has a plate shape and is fixed on a top surface of the body device, and (ii) a support part, which has a plate shape that is continuous with the fixation part and is formed to be bent, the support plate supporting a back surface of the display device by a plate spring part that is formed on the support part and contacts the back surface of the display device,
wherein a part of the body device that contacts the fixation part is formed by an electrically conductive member.

5. The on-vehicle device according to claim 4, wherein the back surface of the display device that contacts the plate spring part and a front surface of the display device that displays information are inclined by a predetermined angle relative to a vertical direction, and
the support part is inclined by the predetermined angle relative to the vertical direction in a state where the fixation part is fixed on the body device.

6. The on-vehicle device according to claim 4, wherein the body device includes:
a housing with a box shape, a length between top and bottom surfaces of the housing being greater than a length between front and back surfaces of the housing; and
a substrate that is electrically connected to the support plate and that is arranged inside the housing so as to have a surface orientation that is parallel to orientations of the front surface and the back surface of the housing.

* * * * *